United States Patent [19]

Hurst

[11] 4,249,950
[45] Feb. 10, 1981

[54] METHOD OF MAKING FLEXIBLE CEMENTITIOUS MATERIALS

[75] Inventor: John Hurst, London, England

[73] Assignee: W. R. Grace & Co. Ltd., London, England

[21] Appl. No.: 45,801

[22] Filed: Jun. 5, 1979

[30] Foreign Application Priority Data

Jun. 14, 1978 [GB] United Kingdom ............... 26874/78

[51] Int. Cl.³ ............................................. C04B 7/35
[52] U.S. Cl. ........................................ 106/90; 106/97; 106/104
[58] Field of Search ........................... 106/90, 97, 104; 260/29.65; 264/319, 340, 333

[56] References Cited

U.S. PATENT DOCUMENTS

| | | | |
|---|---|---|---|
| 3,239,479 | 3/1966 | Roenicke et al. | 260/29.65 |
| 4,014,840 | 3/1977 | Emig et al. | 260/29.65 |
| 4,151,145 | 4/1979 | Emig et al. | 260/29.65 |

*Primary Examiner*—James Poer
*Attorney, Agent, or Firm*—William L. Baker; C. Edward Parker

[57] ABSTRACT

An improved flexible cementitious material is prepared by mixing an aqueous dispersion or latex of elastomeric polymer (e.g. butyl rubber) with cement (e.g. Portland), allowing the mixture to harden typically for 28 days under conditions of high relative humidity, and thereafter compressing the hardened material (e.g. by passing the material between rollers) to reduce the brittleness and to increase the flexibility thereof. The initial cementitious mixture preferably contains additional components such as a dessicant (e.g. lime). The resulting flexible material is useful as a joint filler between concrete structures to take-up deformation therebetween.

16 Claims, No Drawings

METHOD OF MAKING FLEXIBLE CEMENTITIOUS MATERIALS

This invention relates to a method of making flexible materials.

In British Patent Application No. 1,512,781 there is disclosed, inter alia, a method of building employing concrete structures and including the steps providing between at least two adjacent concrete structures a load bearing portion comprising a concrete composition containing a flexibilizing agent in the form of an elastomeric polymer, the proportion of the flexibilizing agent when calculated as polymer in the composition when set being 2 to 50% by weight. That invention is applicable to buildings, in particular tunnels, where adjacent concrete structures which are cast in situ or precast abut one another and there is a tendency for spalling to occur. Spalling is the undesirable splitting, splintering or chipping of the concrete which tends to occur when the concrete is subjected to high local stresses. It is particularly likely to occur in tunnels, where there is great pressure from above and the joints between the concrete structures go into compression as the gap between them deforms.

The present invention is a result of efforts to perfect a material for use between adjacent concrete structures, in particular in tunnels, although it may of course have other applications.

It is proposed to make a flexible cementitious material by mixing a flexibilizing agent in a latex with cement and, preferably, another dessicant, and subjecting the material to pressure after initial setting of the cement, whereupon the material acquires flexibility and improved cohesion while retaining strength.

The compression is preferably performed by rolling, and appears to have the functions of "knitting" the flexibilizing agent, filling any voids there may be and crushing the initially set cement. As a result, the brittle characteristic which would otherwise be apparent is removed and flexibility is acquired and is maintained even though secondary setting of the cement may occur later on.

Preferably, as mentioned, a suitable secondary dessicant in addition to cement is employed.

The cement and dessicant can be added to the latex together, or in either possible succession.

We have found that the latex, cement (and possible secondary dessicant) mixture should, after shaping for instance into boards be initially cured for about 20 to 40 days, for instance 28 days, in conditions of high relative humidity, e.g. 90 to 100%. The compression operation preferably follows a subsequent period of 5 to 10, e.g. 7 days, in which the material is stored under ambient conditions.

As previously mentioned, the materials referred to in British Patent Application No. 1,512,781 require the flexibilizing agent when calculated as polymer in the set composition to be 2 to 50% by weight. In the present Specification different criteria are adopted, and it is suggested that mixtures of, by weight, 15 to 28% latex, 20 to 30% dessicant, 45 to 55% cement with up to 6% of other ingredients are suitable. One particular mixture which may be suitable comprises 22% latex, 50% cement, 24% dessicant and 4% other ingredients. The cement may be Portland, high aluminous sulphate resisting cement or any other appropriate cement. Examples of dessicants are silica gel, a calcium sulphate plaster (for example a hemi-hydrate plaster containing if necessary an accelerator of the rate of setting of the plaster), barium or calcium oxide, calcium chloride, or orthoester (for example trimethyl orthoformate) or a molecular sieve, or quicklime. Among the other ingredients there may be mentioned light oils, stabilisers, antioxidants and surfactants. The light oils can be added to slow down the action of the secondary dessicant. The antioxidants may be of substituted or hindered phenol type, e.g. 2,2'-methylene bis (4-methyl-6-tertiary butyl phenol). The surfactants may be anionic surfactants, e.g. alkyl aryl sulphonates or straight chain alkyl sulphonates.

The flexibilizing agent can be an elastomeric polymer, natural or synthetic and is initially in the form of an aqueous dispersion or latex. Butyl rubber is one possibility. A latex with 30-70%, preferably 40-50% solids is most appropriate. Non-ionic stabilisers (for example polyoxyethylene esters of phenol or long chain aliphatic alcohols) may be usefully added among the other ingredients to prevent premature precipitation of the latex.

The normal setting behaviour of the cement may be modified by impurities or additives. Thus accelerators or retarders may be required. Examples of accelerators are sulphuric acid, potassium and ammonium sulphate while borax is one possible retarder.

The material can, when mixed, be cast, moulded extruded or calendered and then subjected to the initial setting operation. The material can be so prepared in any suitable shape and size, for instance in the form of boards of 0.03 to 10 cm thick.

Good results have been achieved by initially adding lime, cement and the other ingredients to latex in a high powered high speed mixer, casting the mixture into moulds to form boards, storing them for 28 days at nearly 100% relative humidity, then storing them for 7 days in ambient conditions, and then passing them between nip rolls. The resultant material contains a lot of moisture so that secondary setting can occur, but is remarkably flexible, without cracking, and can be subjected to great stress and compressive strain without breaking down.

In addition to the above described process, the invention provides materials made by such process.

I claim:

1. A method of producing an improved flexible cementitious material comprising the steps of
   (a) mixing an aqueous dispersion of elastomeric polymer with a cement capable of hardening upon mixture with water;
   (b) forming the resulting mixture into a hardened mass;
   (c) compressing the hardened mass by subjecting it to pressure sufficient to reduce the brittleness thereof and to increase the flexibility thereof yet retaining the utility of the hardened mass; and
   (d) thereafter removing said pressure and recovering said improved flexible cementitious material.

2. The method of claim 1 wherein a dessicant is included in the mixture which is selected from the group consisting of silica gel, a calcium sulphate plaster, barium or calcium oxide, calcium chloride, orthoester, a molecular sieve, or quicklime.

3. The method of claim 2 wherein the mixture comprises, by weight, 15 to 28 percent of said aqueous dispersion, 20 to 30 percent of said dessicant, 45 to 55 percent of said cement, and up to 6 percent of other ingredients.

4. The method of claim 2 wherein the mixture comprises, by weight, 22 percent of said aqueous dispersion, 50 percent of said cement, 24 percent of said dessicant, and 4 percent of said other ingredients.

5. The method of claim 1 wherein said compression is carried out by pressing said hardened mass between the nip formed by rollers.

6. The method of claim 1 wherein the mixture is initially cured for 20 to 40 days under conditions of relative humidity of 90 to 100 percent prior to said compression.

7. The method of claim 6 wherein the said mixture is cured for 5 to 10 days under ambient conditions following said 20 to 40 days and prior to said compression.

8. The method of claim 1 wherein said mixture additionally includes a light oil.

9. The method of claim 1 wherein said mixture additionally includes a stabilizer to prevent premature precipitation of said dispersion.

10. The method of claim 1 wherein said mixture additionally includes an antioxidant.

11. The method of claim 1 wherein said dispersion is an aqueous butyl rubber latex.

12. The method of claim 1 wherein said mixture additionally includes one of an accelerator and a retarder of the hardening time of the cement in said mixture.

13. The method of claim 1 wherein said cement is Portland or high aluminous sulfate resistant cement.

14. The method of making an improved flexible cementitious product having utility as a jointing material between concrete sections, said method comprising the steps of;
(a) mixing an aqueous dispersion of elastomer polymer with a cement which hardens upon admixture with water to from a mixture;
(b) shaping the mixture and allowing the shaped mixture to harden;
(c) compressing the resulting hardened material by pressing it between rollers, said compression being sufficient to reduce the brittleness or the hardened material and insufficient to destroy said utility of the hardened material as a jointing material; and
(d) thereafter removing said material from said rollers and recovering a flexible cementitious product having utility as a jointing material between concrete sections.

15. The method of claim 14 wherein said mixture comprises, by weight, 15 to 28 percent of said aqueous dispersion, 45 to 55 percent of said cement, 20 to 30 percent of a dessicant, and up to 6 percent of other ingredients.

16. The method of claim 14 wherein the recovered product is subsequently placed between adjacent concrete structures.

* * * * *

UNITED STATES PATENT AND TRADEMARK OFFICE
CERTIFICATE OF CORRECTION

PATENT NO. : 4,249,950
DATED : February 10, 1981
INVENTOR(S) : John Hurst

It is certified that error appears in the above—identified patent and that said Letters Patent is hereby corrected as shown below:

Correct the assignee to read -- W. R. Grace Ltd., London, England --.

Signed and Sealed this

*Thirtieth* Day of *June 1981*

[SEAL]

Attest:

RENE D. TEGTMEYER

*Attesting Officer*     *Acting Commissioner of Patents and Trademarks*